(12) United States Patent
Desai et al.

(10) Patent No.: US 6,877,093 B1
(45) Date of Patent: Apr. 5, 2005

(54) SYSTEM AND METHOD FOR SECURE PROVISIONING AND CONFIGURATION OF A TRANSACTION PROCESSING DEVICE

(75) Inventors: Manish Desai, Houston, TX (US); Mohammad Husain, Humble, TX (US)

(73) Assignee: Commerciant, L.P., Dallas, TX (US)

( * ) Notice: Subject to any disclaimer, the term of this patent is extended or adjusted under 35 U.S.C. 154(b) by 812 days.

(21) Appl. No.: 09/588,367

(22) Filed: Jun. 6, 2000

(51) Int. Cl.[7] .................... G06F 15/177; G06F 17/60; H04L 9/00

(52) U.S. Cl. .................... 713/156; 705/71; 705/75; 709/220

(58) Field of Search .............. 705/71, 75; 713/155, 713/156; 709/220–222

(56) References Cited

U.S. PATENT DOCUMENTS 5,701,343 A * 12/1997 Takashima et al. ......... 705/51
5,745,705 A * 4/1998 Iguchi ........................ 705/21
5,790,677 A * 8/1998 Fox et al. ................... 705/78

OTHER PUBLICATIONS

Microsoft Computer Dictionary, Fifth Edition, p. 346.*

* cited by examiner

*Primary Examiner*—Gregory Morse
(74) *Attorney, Agent, or Firm*—Fulbright & Jaworski LLP

(57) ABSTRACT

The present invention discloses a transaction processing device capable of secure communication over a public network or a private network. In a preferred embodiment, the device is capable of performing various transactions. In the preferred embodiment the system which enables secure transaction processing over a communications network includes a transaction processing device, configured as a standalone transaction processing terminal, capable of secure provisionging and/or configuration over a public network, for example, the Internet. The preferred embodiment transaction processing device is useful for both SOHO type businesses and large businesses.

27 Claims, 6 Drawing Sheets

*FIG. 1*
*(PRIOR ART)*
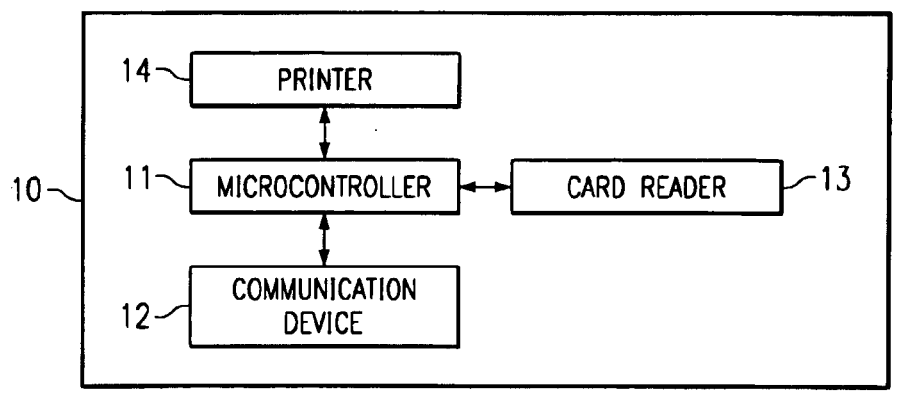
*FIG. 2*
*(PRIOR ART)*
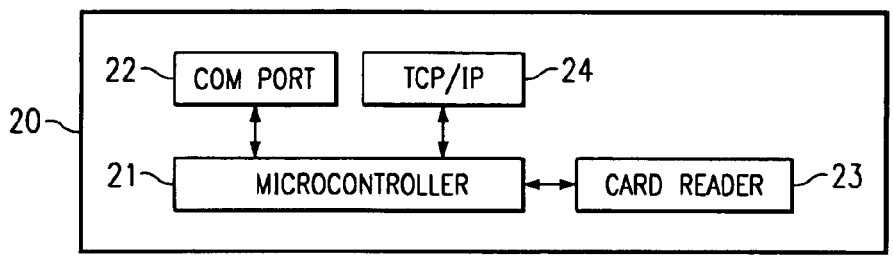
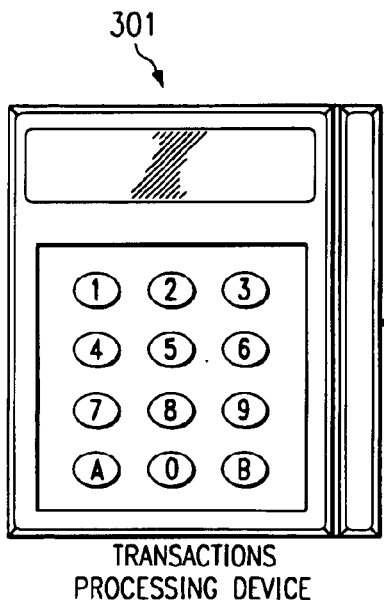
TRANSACTIONS
PROCESSING DEVICE
*FIG. 3*
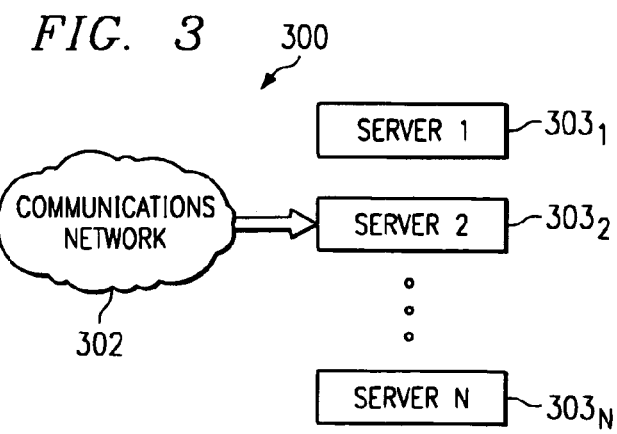

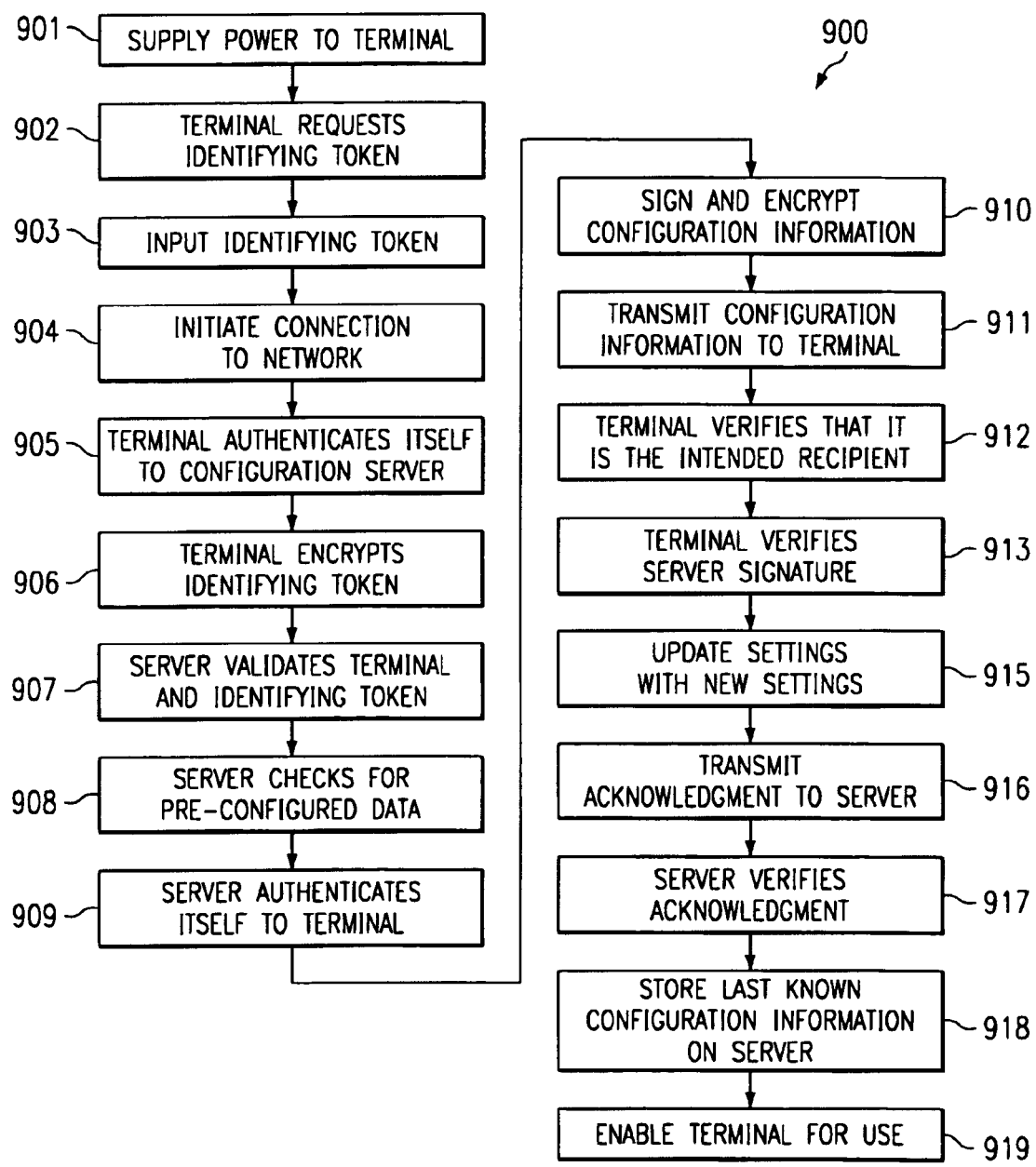

SYSTEM AND METHOD FOR SECURE PROVISIONING AND CONFIGURATION OF A TRANSACTION PROCESSING DEVICE

RELATED APPLICATIONS

The present application is related to concurrently filed, commonly assigned and copending U.S. patent application Ser. No. 09/588,453 entitled "SYSTEM AND METHOD FOR SECURE AUTHENTICATION OF A SUBSCRIBER OF NETWORK SERVICES", the disclosure of which application is incorporated herein by reference.

TECHNICAL FIELD

This application relates to a transaction processing device and in particular to a system and method for secure transaction processing over a communications network using the transaction processing device, such as secure provisioning and configuration of the transaction processing device.

BACKGROUND

Existing credit and debit card processing systems utilize a card processing terminal, which is connected to a processing network, such as a private network for credit and/or debit card processing. In the prior art, a merchant desiring to accept credit and/or debit card payment from customers, applies for a merchant account with a data processor or bank. Upon reviewing and accepting the application, the merchant is required to purchase a card processing terminal. The merchant can also use a terminal already in his/her possession. A representative of the data processor/bank visits the merchant's location and configures the terminal for use with the processing network. Alternatively, a representative of the data processor/bank can also provide instructions to the merchant in writing or over the phone on how to configure the terminal. Such configuration information includes the merchant's account number, telephone numbers to access the processing network, passwords, business information, and information as it appears on a customer's receipt. After configuring the terminal and testing the settings, a merchant has the ability to accept credit and/or debit cards from consumers.

A consumer desiring to make payments for goods or services purchased at a retail location would typically present his/her credit or debit card to a representative of the merchant at the check out counter. The representative at the check out counter would swipe the card across a card reader which is typically attached to, or part of the processing terminal. Once the card is swiped, information associated with the transaction is transmitted via a private network maintained by private network operators, such as FIRST DATA CORP., to a server associated with the private network. The private network server in turn sends information associated with the transaction to a server associated with the bank issuing the card (the issuing bank), again through a private network maintained by the private network operator. The issuing bank then sends back authorization for charging the card to the server maintained by the private network operator, which in turn sends the authorization to the retail location.

Upon receiving authorization from the issuing bank, a printer associated with the host computer which is typically separate from the card processing terminal would print a receipt for the customer to sign. The merchant provides a copy of the signed receipt to the customer and keeps the original receipt for bookkeeping or other purposes.

If a merchant wishes to add additional terminals to the same location or other location, then it is necessary for the merchant to obtain the required number of terminals and once again seek assistance from a representative of the data processor/bank as described above to configure the terminal.

FIG. 1 shows a schematic of a card processing terminal 10 of the prior art. Card processing terminal 10 includes a microcontroller with different components, such as a processor, random access memory, read only memory, I/O control unit, clock, etc. being part of the microcontroller 11. Microcontroller 11 is connected to a communications device 12, such as a modem for communication with an external network, such as the above mentioned private network. The microcontroller is also connected to a card reader, such as a magnetic card reader or a magnetic ink character reader 13. A printer 14 is optionally connected to the microcontroller to print a receipt for the transaction once authorization is received from the issuing bank. Thus, in FIG. 1, the aforementioned components are part of the same device or card processing terminal. The card processing terminal 10 described above is capable of conducting credit card transactions over a private network. However, it does not have any capability for performing secure transmissions over the private network. The capability for secure transmission in not necessary in the card processing terminal of FIG. 1 because it is adapted to work over a private network. However, in order to provide secure communications using the card processing terminal 10 of FIG. 1, the terminal 10 would have to be attached to an external computer capable of providing the desired secure communication over the private network.

FIG. 2 shows a schematic of another card processing terminal 20 of the prior art. Card processing terminal 20 is designed for use as a peripheral to a host computer system. Card processing terminal 20 includes a microcontroller with different components, such as a CPU, a random access memory, read only memory, I/O Control Unit, clock, etc. being part of the microcontroller 21. Microcontroller 21 is connected to a card reader 23, such as a magnetic card reader or a magnetic ink character reader. An operating system running on the card processing terminal 20 includes a communications protocol stack such as TCP/IP 24. Card processing terminal 20 further includes a communication port 22 for connecting the terminal to a local host computer. However, it does not include a communication device, such as an Ethernet card, a modem, or the like, that would enable it to connect directly with a private network. Moreover, the card processing terminal 20 is not intended for use as a standalone device. It interfaces with a local host computer through communication port 22.

Because of the presence of the card reader 23, terminal 20 is capable of accepting information from cards by means of card swipes. Typically when a peripheral card processing terminal, like terminal 20 is used, the communication over the private network is performed by the local host computer, which takes transaction information from the peripheral and passes it through the private network to the private network servers. Thus, once the card processing terminal 20 accepts the card swipe, it transmits that information associated with a particular transaction to the local host computer, which then passes the information to a private network for authorization.

The card processing terminal 20 along with the host computer described above is capable of conducting credit card transactions over a private network. However, terminal 20 of FIG. 2 does not include a printing device capable of printing receipts once a transaction is complete.

Accordingly, a separate printer has to be attached to the local host computer to print the receipts upon receiving authorization from the issuing bank.

A significant amount of effort is involved in provisioning and configuring the card processing terminals of FIGS. 1 and 2 so that they may be used for credit and/or debit card processing. Because of this complexity, a representative of the data processor/bank is required on site or over the telephone during the configuration process, thereby creating an expensive process the cost of which is generally borne by the merchant.

It should be clear that the use of existing card processing terminals requires a merchant to make a large initial investment in the purchase of various services and equipment in addition to the card processing terminal, such as application fees, setup fees, reprogramming fees, a receipt printer and/or a local host computer connected to the card processing terminal and/or a printer. Moreover, there are additional costs associated with leasing the communication lines from private network operators, such as FIRST DATA CORP. Leasing the equipment is also an option for merchants. However, leasing requires an on-going expense for the merchant in terms of the cost of the lease and adds to the overhead costs associated with operating a business. Furthermore, existing private network operators typically require multi-year contracts from merchants desiring to provide credit card processing facilities at their retail locations. Moreover, most card processing terminals currently in use that require a local host computer system for operation require some kind of custom software in order for them to be properly integrated with the host computer.

Because of the costs associated with leasing and/or purchasing the various equipment needed for implementing a card processing system, and the costs associated with installing a card processing system, such systems are not being used by many small office/home office (SOHO) type businesses. However, because of the preference of many consumers for using credit cards and the inherent risks associated with carrying large amounts of cash, many consumers avoid patronizing businesses that do not accept credit cards. Thus, small businesses that do not provide credit card processing facilities lose a substantial amount of business to large businesses that provide such credit card processing facilities.

Therefore, there is a need in the art for a system and method for secure transaction processing over a public or private network, such as secure provisioning and configuration of a transaction processing device, that can be used by both large businesses and SOHO type businesses.

SUMMARY OF THE INVENTION

These and other objects, features and technical advantages are achieved by a system and method which enables secure transaction processing over a communications network. In the preferred embodiment, such a system includes a transaction processing device, configured as a standalone transaction processing terminal, capable of secure remote provisioning and/or configuration over a public network, for example, the Internet.

In a preferred embodiment, the system for remote configuration of the transaction processing device comprises a transaction processing device for providing a network service; and a remote configuration server, wherein the configuration server is capable of communicating securely with the transaction processing device via a public communications network, wherein the transaction processing device is capable of communicating securely with the configuration server via the public network, and wherein the transaction processing device is capable of being remotely configured by the configuration server via the public communications network.

The preferred embodiment method for remotely providing updated configuration information related to a subscriber account to one or more transaction processing devices from a remote server comprises the steps of allowing a subscriber to access a configuration web site of a provider of the subscriber account; allowing the subscriber to select at least one transaction processing device associated with the subscriber account to be provided with configuration information; receiving updated configuration information about the selected transaction processing device; receiving authorization to provide the updated configuration information to the selected transaction processing device; and remotely providing the updated configuration information to the selected transaction processing device.

A preferred embodiment method for remotely configuring a transaction processing device comprises the steps of authenticating the transaction processing device by a configuration server; authenticating the configuration server to the transaction processing device, if the configuration server includes configuration data about the transaction processing device; providing the configuration data to the transaction processing device by the configuration server; storing the provided configuration data by the transaction processing device; receiving by the configuration server an acknowledgment from the transaction processing device; and storing the received information including the configuration data by the configuration server.

Therefore, it is a technical advantage of a preferred embodiment of the present invention to provide a transaction processing device capable of utilizing a public network for communicating with a remote server without compromising the transmitted information.

It is another technical advantage of a preferred embodiment of the present invention to provide a multi-purpose standalone point-of-sale (POS) Internet enabled device capable of secure transaction processing over the Internet.

It is another technical advantage of a preferred embodiment of the present invention to provide a system and method for remote secure communication and/or synchronization of configuration related information, requests and/or software modules of a transaction processing device.

It is yet another technical advantage of a preferred embodiment of the present invention to provide a system and a method for a subscriber to update configuration information of one or more transaction processing devices, through a web based user interface that is hosted by a remote server, thereby eliminating the need to provide such configuration capability on the transaction processing device itself.

It is yet another technical advantage of a preferred embodiment of the present invention to provide a system and method to securely add configuration information to or remove configuration information from a transaction processing device without physically modifying the transaction processing device.

It is still another technical advantage of a preferred embodiment of the present invention to provide a multi-purpose standalone point-of-sale (POS) Internet enabled device capable of secure remote provisioning and/or configuration over the Internet.

It is still another technical advantage of a preferred embodiment of the present invention to provide a system and method for remote configuration of a transaction processing device without the help of a representative of the provider of the transaction processing device.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, and the advantages thereof, reference is now made to the following descriptions taken in conjunction with the accompanying drawing, in which:

FIG. 1 shows a schematic of a standalone card processing terminal of the prior art;

FIG. 2 shows a schematic of a peripheral card processing terminal of the prior art;

FIG. 3 shows an overview of a preferred embodiment network for remote configuration;

FIG. 9 shows a preferred embodiment flowchart for configuring the transaction processing device of the preferred embodiment.

DETAILED DESCRIPTION

FIG. 3 shows an overview of a preferred embodiment network 300 for remote configuration. Network 300 comprises a transaction processing device 301, such as for example a standalone Internet enabled device as discussed in more detail below with reference to FIGS. 4 and 5. Transaction processing device 301 communicates with one or more servers $303_1$, through $303_N$ via a communications network 302. In the preferred embodiment, one or more of servers $303_1$ through $303_N$ is a configuration server, as discussed in detail below with reference to FIG. 6. In the preferred embodiment, the communications network 302 is a public network, such as the Internet. In alternative embodiments, the communications network may be a private network.

The process of applying for and activating a subscriber account to provide a network service, for example a payment processing service, by a subscriber, such as a merchant desiring to provide a network service, such as for example credit/debit card processing services, has been discussed in detail in the above referenced U.S. Patent Application entitled "SYSTEM AND METHOD FOR SECURE AUTHENTICATION OF A SUBSCRIBER OF NETWORK SERVICES", the disclosure of which is incorporated herein by reference.

Figure 4:
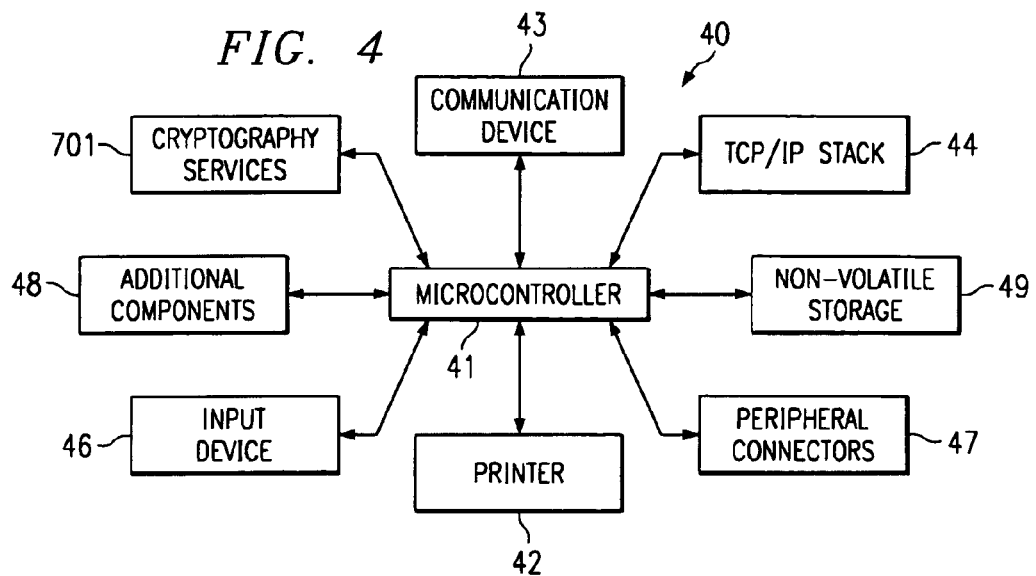
FIG. 4 shows a schematic of a transaction processing device of the preferred embodiment.

FIG. 4 shows a schematic of a standalone Internet enabled transaction processing device 40 of the preferred embodiment. The transaction processing device of the preferred embodiment can be configured for performing various tasks as described in more detail later. Transaction processing device 40 includes a microcontroller 41 with different components, such as a processor, random access memory, read only memory, I/O control unit, clock etc., being part of the microcontroller 41. Although, in the preferred embodiment, the various components are part of the microcontroller, in alternative embodiments, some of these components may be external to the microcontroller.

The transaction processing device 40 preferably also includes a hardware implementation of a communications protocol stack, such as a TCP/IP stack 44 for facilitating communication over communications network 302. Although, in the preferred embodiment the TCP/IP stack 44 is implemented in hardware, in an alternative embodiment, it may be implemented in software and be part of an operating system running on the transaction processing device 40. However, a software implementation of TCP/IP is very memory intensive and requires a substantial amount of memory to execute and therefore is generally not preferable in an implementation optimized for low cost. Microcontroller 41 is preferably coupled to a communications device 43, such as a modem, an Ethernet card, and/or the like, for communication via an external network, such as a public network and/or a private network.

The preferred embodiment transaction processing device 40 preferably also includes a hardware implementation of cryptographic services 701, such as RSA, elliptic curve, DES, Triple DES, MD5, SHA1 and/or the like coupled to the microcontroller 41. Although in the preferred embodiment the cryptographic services are implemented in hardware, in an alternative embodiment, cryptographic or encryption services may be implemented in software and be part of the operating system running on transaction processing device 40. However, a software implementation of cryptographic services may be very computation intensive and may require a substantial amount of memory and/or power to execute, and therefore is generally not preferable in an implementation optimized for low cost and/or low power. The presence of the cryptographic services 701 on device 40 allows secure communication of information over a public network, such as the Internet, and/or a private network. Thus, the transaction processing device 40 does not require a separate host computer for providing secure communication over a public network, such as the Internet.

Microcontroller 41 is also preferably coupled to an input device 46. The input device 46 may be a card reader 46, such as a magnetic card reader, a magnetic ink character reader, a smart card reader and/or the like. The card reader 46 is capable of reading information from a card, such as a credit card, a debit card, a calling card, a driver's license, a smart card or the like and providing at least part of the information read from the card to microcontroller 41. If desired, the card reader may decode the information before providing the information to microcontroller 41. In alternative embodiments, the input device may read information from other devices, such as refrigerators, entertainment systems, heating and cooling systems, and/or the like. Thus, if desired, the transaction processing device could read information from these devices and provide the information to a server, which could then contact another device, such as a web enabled wireless device, for example, an Internet enabled wireless phone, and provide the information from the transaction processing device to the wireless phone. The user of the web enabled wireless phone could then instruct the transaction processing device, preferably through the web server, to perform certain tasks, such as set the temperature to a desired degree. The microcontroller on the transaction processing device could then instruct the heating or cooling system to set the temperature to the desired degree.

A printer 42 is also optionally coupled to the microcontroller and is part of the transaction processing device 40. Printer 42 may be used to print a receipt for a transaction, such as a receipt for payment of goods and/or services, or it may be used to print other information such as information relating to the business of the provider of goods and/or services, information relating to the consumer, reports on configuration information downloaded, or other information. In an alternative embodiment, the transaction processing device 40 includes a printer driver connected to the microcontroller 41 in addition to or in place of the printer. The printer-driver is capable of driving an external printer under control of microcontroller 41.

The transaction processing device 40 of the preferred embodiment is capable of communicating over a public network and/or a private network. For this purpose, device 40 preferably includes a user-controlled switch (not shown) that controls whether device 40 communicates with a private network or with a public network. In an alternative embodiment, software can be used to select whether device 40 communicates with a private network or with a public network. Moreover, in other embodiments, the determination of whether a public network or a private network is used for a particular communication may be based on the information read from a card. Thus, device 40 of the preferred embodiment can be used for providing secure communication over a private network and thus can utilize private networks already in existence. It can also be used for providing secure communication over a public network and thus can utilize a public network such as the Internet for secure communication with a remote server.

The transaction processing device also preferably includes a PRAM (persistent RAM). The PRAM may be used for storing information, such as for example, date, time, cryptographic keys, certificates and/or the like. Thus, the PRAM may be used for continuity of information between power ups and the persistent storage of cryptographic keys and certificates.

The preferred embodiment transaction processing device 40 of FIG. 4 preferably includes the above mentioned components all in the same housing and can be used for secure communication over a public network, such as the Internet without the need to interface with a local host computer. Moreover, if desired, a provider of goods and services may use the transaction processing device 40 of the preferred embodiment as a point-of-sale terminal without requiring a local host computer to provide cryptographic services. This is especially useful for small office/home office (SOHO) type businesses who cannot afford to provide card services, such as credit card services, debit card services, and/or the like as they are currently implemented.

The transaction processing device 40 of FIG. 4 may be used by these SOHO type businesses because device 40 does not need to connect to a private network, which is controlled by private network operators like FIRST DATA CORP., but can instead communicate securely over a public network, such as the Internet, which is more accessible and cheaper to use. Thus, the SOHO type businesses do not need to sign multi-year contracts which data processor, banks and/or private network operators typically require for accessing the authorization networks and/or for purchasing or leasing the equipment. Moreover, the transaction processing device 40 of FIG. 4 need not be manually provisioned or configured with the help of a representative of the data processor/bank thereby reducing the cost of installing the transaction processing device.

Because the aforementioned components are included in the same device, the transaction processing device is portable and can be easily carried. For example, there are many businesses whose place of providing goods and/or services to consumers is not fixed, such as businesses who attend trade shows, door-to-door salespeople, businesses providing transportation services, or the like. These businesses may advantageously utilize the preferred embodiment transaction processing device. The transaction processing device of the preferred embodiment is also capable of connecting to the Internet via wireless means. Thus, these businesses can also conduct secure transaction over the Internet by wireless means. For example, the driver of a cab wishing to process credit cards presented by passengers can quickly set up a device without requiring assistance from a sales person or technical representative of the data processor/bank. The driver can then accept credit card payment by connecting the transaction processing device of the preferred embodiment to a power supply, and connecting to the Internet by wireless means. In the alternative, additional memory may be included in the transaction processing device, to store transaction information which may be batch processed at periodic intervals.

The transaction processing device 40 of the preferred embodiment also includes non-volatile storage 49 connected to microcontroller 41. The non-volatile storage 49 is capable of storing data, such as information about different transactions, a plurality of software modules or other information. Thus, a particular provider of goods and/or services may store a plurality of transactions on this non-volatile storage and batch process the stored transactions at periodic intervals, thereby eliminating the need to authorize transactions on a per transaction basis.

Peripheral connectors 47 may also be connected to microcontroller 41. The peripheral connectors are generally use for connecting the terminal to a printer or separate pin pad. The peripheral connectors could also be utilized to connect various devices to the microcontroller. For example, a peripheral device, such as an audio player, a video player, or the like, could be interfaced with the transaction processing device using the peripheral connectors. Such a device may then connect to the Internet using the transaction processing device of the present invention for various purposes. For example, information, such as music and/or movies could be downloaded from the Internet and played over the audio and/or video player. The peripheral device itself may include a microcontroller with a unique identifier. This unique identifier may be used to identify the peripheral device and associate the particular peripheral device and/or the transaction processing device to an account on a server, such as a web server. The transaction processing device may alternatively or in addition to the peripheral device, include its own unique identifier which may be utilized to authenticate the transaction processing device and/or associate the transaction processing device with an account on a server, such as a web server.

Other components 48 may also be connected to microcontroller 41. Such other components include a speaker, interfaces to external sensors, such as burglar alarms or temperature sensors, a transmitter and/or a receiver. The transmitter may be an infrared or radio frequency transmitter for transferring signals to other devices capable of receiving infrared or radio frequency signals. The receiver may be an infrared or radio frequency receiver for receiving signals from other devices capable of transmitting infrared or radio frequency signals. This capability allows for the creation of a wireless local network, which can be utilized for sharing a single communications path to the configuration server between multiple devices.

Figure 5:
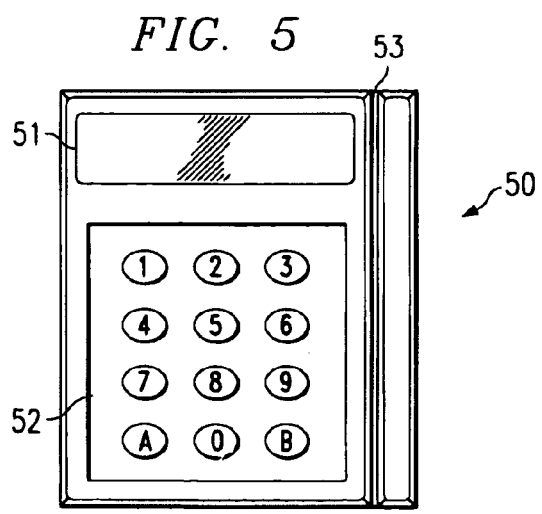
FIG. 5 shows a pictorial representation of a transaction processing device of the preferred embodiment.

FIG. 5 shows a pictorial representation of a transaction processing device 50 of the preferred embodiment. As shown in FIG. 5, transaction processing device 50 includes a display screen 51, keypad 52 and card reader 53. The display screen may be an LCD (liquid crystal display), VFD (vacuum fluorescent display), a LCD and touch screen combination, or the like. Display 51 may be used for various purposes, such as prompting a user, displaying business specific information such as a logo, displaying the progress of a transaction, displaying advertisements, news, stock quotes, movie schedules, flight information, weather information or other information. This is specially useful when a consumer is waiting at the check out counter of a retail location while the clerk is scanning the customer's purchased goods.

Display 51 may be used during configuration of the terminal to prompt the merchant to input information such as identifying tokens, passwords, response to challenge questions, and/or to display the progress of the configuration transaction.

The displayed information may be personalized. For example, if the customer has an infrared signal transmitting device associated with the person of the customer, such as a device attached to or part of the customer's watch, the customer's clothes, etc., the transaction processing device may receive the infrared signal from the transmitter by utilizing the infrared signal receiver associated with the device and provide personalized information to the customer on the display. In alternative embodiments, information from the card may be used to provide personalized information to the customer. For example, when a card is swiped the transaction processing device knows the identity of the card owner and also other information, such as the card owner's buying habits, and thus provide personalized information to the customer.

The information displayed on the display screen may be interactive. For example, by using keypad 52 or the display screen, the user can respond to specific queries in order to complete other transactions not associated with the particular merchant whose retail outlet the consumer is located in. Thus, a consumer can purchase movie tickets, airline tickets, buy or sell stocks, participate in Internet auctions or other sales promotion while waiting at the check out counter.

Figure 6:
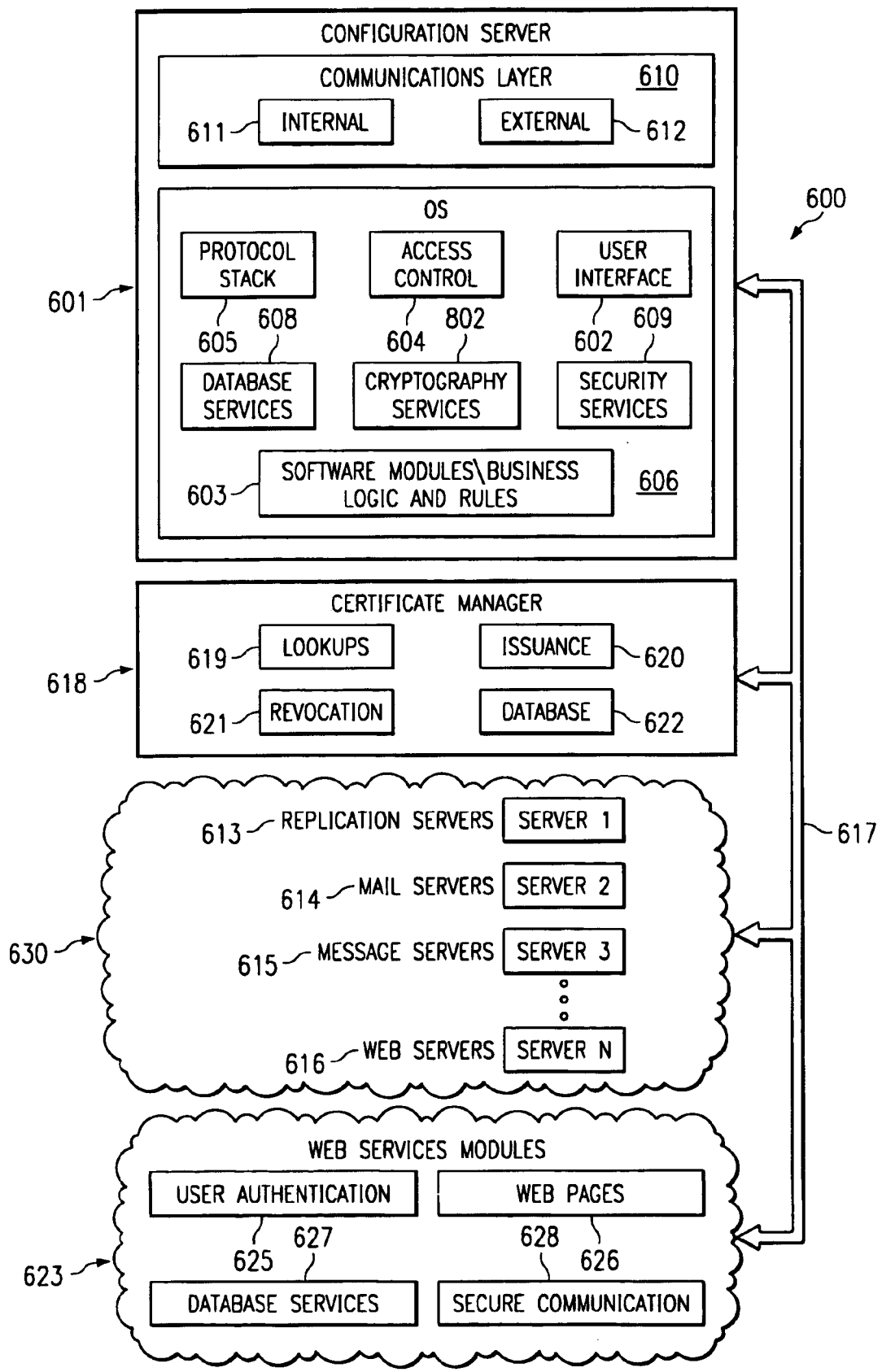
FIG. 6 shows a schematic of a preferred embodiment configuration server.

FIG. 6 shows a schematic of a preferred embodiment configuration server 600. In the preferred embodiment, configuration server 600 comprises of a configuration module 601, an administrative module 630, a web services module 623, and a certificate manager 618. If desired, in alternative embodiments, the administrative module, the web services module and the certificate manager may be separate from the configuration server. In the preferred embodiment, the configuration module 601, the administrative module 630, the web services module 623, and the certificate manager 618 communicate with each other securely via communications channels 617.

In the preferred embodiment, the configuration module 601 comprises an operating system 606 and a physical communications layer 610. In the preferred embodiment, the operating system 606 includes a user interface 602, one or more software and/or business logic modules 603, an access control module 604, a cryptography services module 802, a database services module 608, and a security services module 609. In the preferred embodiment, the operating system 606 also includes a communications protocol stack 605, such as a TCP/IP stack for facilitating communication with one or more transaction processing devices over a communications network, such as an external communications network. In the preferred embodiment, communications layer 610 includes an internal interface 611 for communications with an internal network of computers and an external interface 612 for communications with an external network, such as an external private or public network, for example, the Internet.

In the preferred embodiment, the administrative module 630 includes one or more replication and redundancy servers 613, one or more mail servers 614, one or more message servers 615, and/or one or more web servers 616.

In the preferred embodiment, the web services module 623 comprises of one or more web servers 624. In the preferred embodiment web server 624 comprises of a user authentication module 625, a web page storage and request handler module 626, and a database services module 627 and a secure communication module 628.

In the preferred embodiment certificate manager 618 comprises of a certificate lookup module 619, certificate issuance module 620, certificate revocation module 621, and a certificate database storage module 622.

In the preferred embodiment, the transaction processing device includes a cryptographic key pair. A request for certificate issuance is received by the certificate manager 618 from the transaction processing device preferably over the secure communication channel 617. Certification manager 618 issues a certificate and transmits it back to the transaction processing device. In the preferred embodiment, the issued certificate is also stored in the certificate manager database storage module 622. Additionally or in the alternative, the certificate may also be stored in the cryptographic services module 802.

When a merchant is ready to configure the device, a configuration request is transmitted to configuration server 600. In the preferred embodiment, the configuration module 601 retrieves the certificate about the device from the certificate manager 618. In the preferred embodiment, the security services module 609 extracts the public key from the aforementioned certificate and preferably utilizes the cryptography services module 802 to authenticate the device and the configuration request. Upon successful authentication, the business rules in software module 603 are utilized to determine if configuration information about the particular device is available in the database services module 608. Upon successful retrieval of configuration information about the device, software module 603 utilizes the cryptography services module 802 to sign a hash of the retrieved configuration data with the private key of the configuration server module 601. Additionally, or in the alternative, the configuration data may be encrypted with the previously extracted public key of the transaction processing device. In the preferred embodiment, the signed and/or encrypted data is stored in the database services module 608 and transmitted back to the device via external interface 612.

In the preferred embodiment, the replication and redundancy servers 613 are utilized to provide mirror images of the configuration server module to manage unexpectedly high demand. Mail servers 614, message servers 615, and web servers 616 are preferably utilized for various internal and external tasks, such as for example the creation of mail messages, for example to apprise users and support personnel of problems, to interface with external trusted systems, to provide various reports, for example usage and/or availability reports, and/or other tasks.

In the preferred embodiment, web services module 623 utilizes one or more web servers 624 to provide a merchant with a full-featured user interface in the form of web pages that are accessible through most standard web browser software. Utilizing the user authentication services module 625, the server authenticates users who wish to access the web pages preferably by verifying a user name and password supplied by the user.

Figure 7:
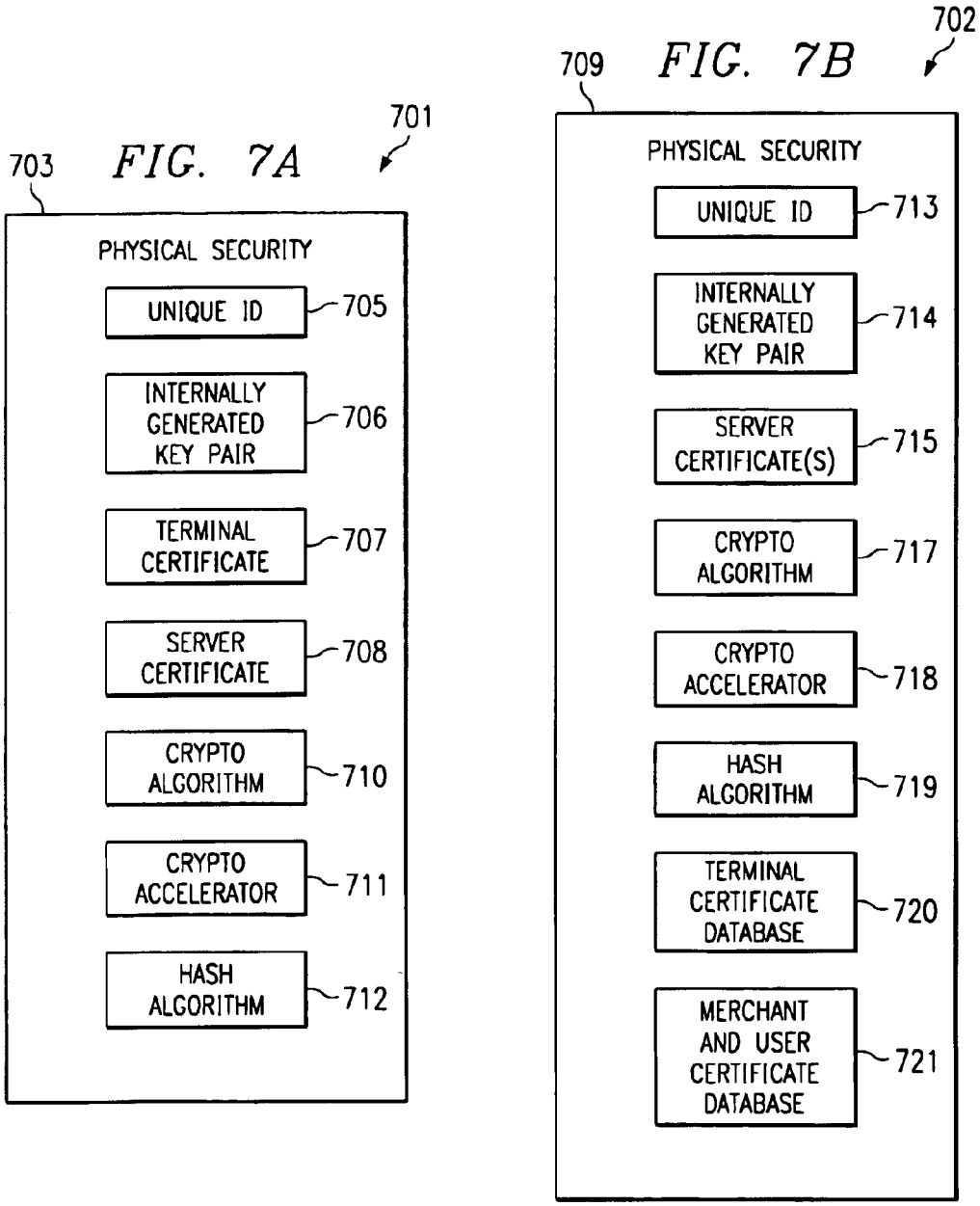
FIG. 7A shows a schematic diagram of the preferred embodiment cryptographic services of the transaction processing device.
FIG. 7B shows a schematic diagram of the preferred embodiment cryptographic services of the configuration server.

FIG. 7A shows a schematic diagram of the preferred embodiment cryptographic services 701 of the transaction processing device. Cryptographic services 701 facilitate secure provisioning and configuration of the transaction processing device. The physical security 703 of the device provides physical protection against compromising the system, for example, to prevent a malicious individual from physically extracting sensitive information by applying electrical probes directly on the device. Each transaction processing device has an ID, which is preferably generated during manufacturing the device. The ID 705 is preferably stored in the cryptographic services 701. The ID 705 of the device is preferably sufficiently unique so as to reasonably eliminate the possibility of manufacturing more than one terminal 701 with the same ID. In the preferred embodiment, the terminal's unique ID 705 cannot be altered or changed after it has been created. Also, in the preferred embodiment the key pair 706 associated with each device is internally generated in the terminal in order to ensure that it has not been altered or compromised during the manufacturing process. As discussed above, the certificate 707 of the device is received from certificate manager 618 of FIG. 6. The configuration server also has a certificate 708 associated with it. In the preferred embodiment, server certificate 708 is generated during the server setup process by transmitting a request, preferably securely to certificate manager 618 of FIG. 6. The server certificate is preferably stored in database 622 of certificate manager 618. During the manufacture of the device the server certificate 708 is retrieved from certificate manager 618 and stored in the device. In the preferred embodiment, replacement certificates are periodically provided to the server. In the preferred embodiment of the present invention, cryptographic services 701 also includes one or more cryptographic algorithms 710, such as RSA, DES, triple DES, elliptic curve and/or the like, one or more hashing algorithms 712, such as SHA1, MD5 and/or the like.

If desired, these cryptographic algorithms and/or hashing algorithms could be implemented in hardware. Moreover, a cryptographic accelerator 711, such as a large modulus and exponentiation computation hardware, could be utilized to improve the overall performance of the cryptographic services.

FIG. 7B shows a schematic diagram of the preferred embodiment cryptographic services 702 of the configuration server. Cryptographic services 702 facilitate secure provisioning and configuration of the transaction processing device. The physical security 709 of the server provides physical protection against compromising the system, for example, by malicious third parties who might want to alter information in the associated databases or extract the various sensitive key sets utilized in the system. Physical security may also be provided by physically securing the location of the server. Each server has an ID associated with it. The ID 713 is preferably stored in the cryptographic services 702. The ID 713 of the server is preferably unique. In the preferred embodiment, the server's unique ID 713 cannot be altered or changed after it has been created. Also, in the preferred embodiment a key pair 714 associated with each server is internally generated in the server in order to ensure that it has not been altered or compromised during the manufacturing process. The cryptographic services 702 of the configuration server also has a copy 715 of the server certificate 708. In the preferred embodiment of the present invention, cryptographic services 702 also includes one or more cryptographic algorithms 717, such as RSA, DES, triple DES, elliptic curve and/or the like, one or more hashing algorithms 719, such as SHA1, MD5, and/or the like. If desired, these cryptographic algorithms and/or hashing algorithms could be implemented in hardware. Moreover, a cryptographic accelerator 718, such as a large modulus and exponentiation computation hardware, could be utilized to improve the overall performance of the cryptographic services. The cryptographic services 702 also include a terminal certificate database 720, which is capable of storing certificates associated with terminals. Moreover, cryptographic services 702 also preferably includes a merchant and user certificate database 721 which may be used to store merchant certificates, if desired. Merchant certificates and user certificates may be utilized in place of or in addition to user names and passwords for access control to add an additional layer of security. Such certificates may be issued for example by certificate manager 618 of FIG. 6 or may be issued by trusted third party organizations, such as banks, government agencies, certifying authorities and/or the like.

The cryptographic services 701 and 702 described above with reference to FIGS. 7A and 7B allow the transaction processing device and the configuration server to authenticate each other if desired and also allow the protection of data that is transmitted between the transaction processing device and the configuration server.

Figure 8:
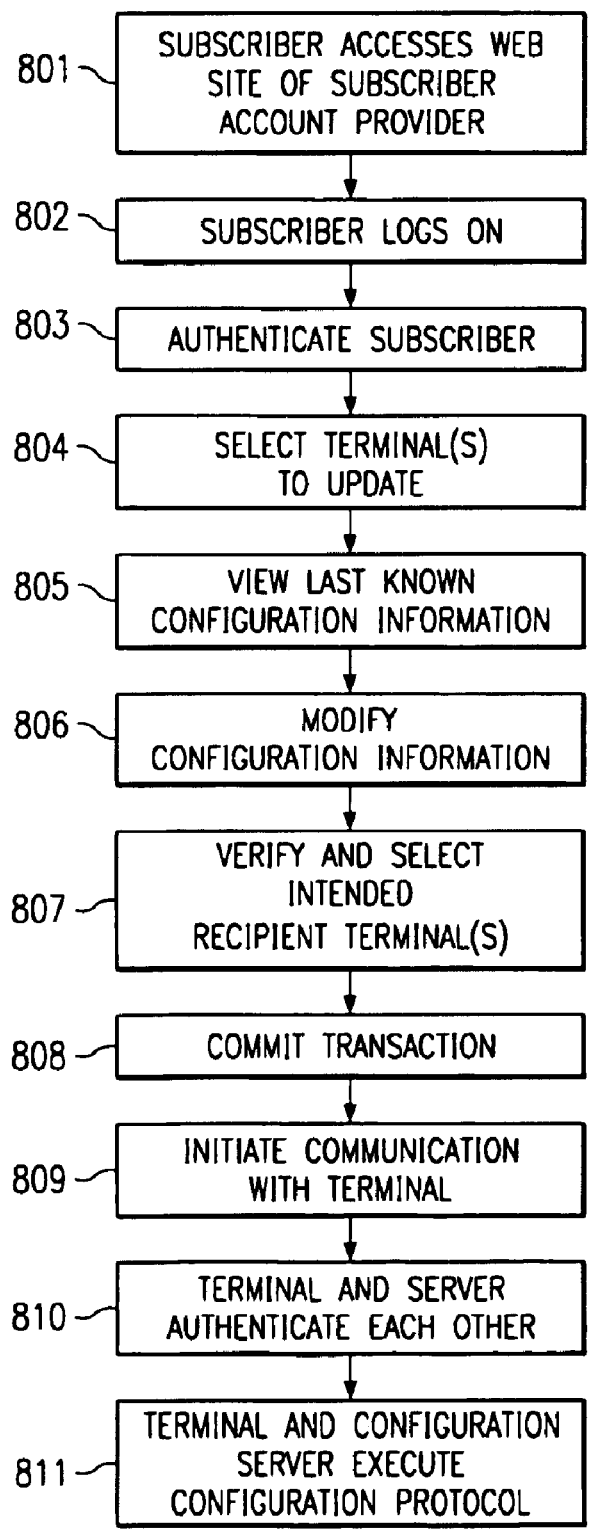
FIG. 8 shows a preferred embodiment flowchart for updating configuration information about the transaction processing device.

FIG. 8 shows a preferred embodiment flowchart 800 for updating configuration information about the transaction processing device, such as a standalone Internet enabled device. If the subscriber, such as the merchant, wishes to update configuration information of the device, such as by changing the settings of the terminal, adding software modules to the terminal, removing software modules from the terminal, replacing software modules on the terminal, and/or the like, the subscriber may access a web site hosted by the subscriber account provider (step 801). In step 802 the subscriber logs onto the web site preferably utilizing a username and password, preferably provided to the subscriber by the subscriber account provider. In step 803, the server authenticates the subscriber, preferably by verifying the username and password of the subscriber. In the preferred embodiment, once the server authenticates the subscriber the server preferably presents the subscriber with a list of terminals associated with the particular username. In step 804, the subscriber selects one or more terminals whose configuration information is to be updated. In step 805 the subscriber is presented with the stored configuration information about the selected terminals. In step 806 configuration information about one or more of the selected terminals is modified. The configuration information may be modified either directly or indirectly. The configuration information may be modified indirectly by the subscriber selecting different services or software modules. Additionally or in the alternative, configuration information may be modified directly by the subscriber, for example, by adding additional information or by changing the subscriber's logo, business name, terminal identifying monikers, address, telephone number, URL, fax number, email address, and/or the like.

In step 807, the subscriber selects and verifies the intended recipient terminals, i.e. the terminals to be updated with the new configuration information. The advantage of this step is that it reduces the risk of inadvertent changes from occurring. It also allows for an easy to implement transactional architecture. In alternative embodiments, the step of selecting and/or verifying may be eliminated, if desired. In step 808, the subscriber authorizes the changes to occur at the next available opportunity or at a predetermined time.

In the preferred embodiment, in step 809, the configuration server initiates communication with one or more of the selected terminals. In alternative embodiments, in step 809, one or more of the selected terminals may initiate contact with the configuration server. In step 810, in the preferred embodiment, both the server and terminal authenticate each other. However, in alternative embodiments, only one of them may authenticate the other. In step 811 the terminal and/or configuration server execute configuration protocol as described below with reference to steps 908 through 918 of FIG. 9.

FIG. 9 shows a preferred embodiment flowchart 900 for configuring the transaction processing device of the preferred embodiment. In step 901, the subscriber, for example the merchant, supplies power to the transaction processing device, such as the above mentioned Internet enabled terminal. Also, if desired, any other cables, such as phone lines, printer cable, and/or the like, are plugged in. In step 902, the terminal prompts the user to enter an identifying token. In the preferred embodiment, the identifying token may be a token previously provided to the subscriber by the subscriber account provider. In alternative embodiments, the identifying token may be a token previously provided to the subscriber by a third party, i.e. any party other than the subscriber account provider. In yet other embodiment, the identifying token may be a combination of tokens provided to the subscriber by both the subscriber account provider and a third party other than the subscriber account provider. In step 903, the subscriber inputs the identifying token onto the terminal. In step 904, the terminal initiates connection with a communications network, which may be a private network or a public network.

In the preferred embodiment, in step 905 the terminal authenticates itself to the configuration server, for example, by signing some data with the private key of the terminal's key pair. This signature is verified by the configuration server by using the public key of the terminal's key pair and comparing the signed data to ensure that it was signed by the corresponding private key which is only known to the terminal. In step 906 the terminal preferably encrypts the identifying token, and transmits the encrypted token to the configuration server. Upon receiving the encrypted token, the configuration server validates the terminal and identifying token (step 907) and checks if configuration data about the particular terminal is available (step 908). If configuration data intended for the terminal is available, then in step 909, the server authenticates itself to the terminal, for example, by signing data with the private key of server's key pair. This signature is verified by the terminal by using the public key of the server's key pair and comparing the signed data to ensure that it was signed by the corresponding private key which is only known to the server. In step 910, the server signs and/or encrypts at least a portion of the configuration information, and transmits the encrypted and/or signed data to the terminal (step 911).

In step 912, the terminal verifies that it is the intended recipient of the data received from the configuration server. In step 913, the terminal verifies that the signed data was in fact signed by the configuration server. Also, if desired, in step 913, the terminal verifies any time-stamps or sequence numbers that may be associated with the configuration data received from the server to guard against replay attacks. In step 915, the terminal updates the settings of the terminals with new settings. Additionally, or in the alternative, the terminal may update any software modules with new software modules. For example, a software module designed to provide time and attendance tracking capability in addition to transactions processing capability may be received by the terminal which can then provide this new feature to its users. In step 916, the terminal transmits an acknowledgment to the configuration server. If desired, the acknowledgment from the terminal may be signed by the terminal.

Upon receiving the acknowledgment in step 917, the server verifies that the received acknowledgment has been transmitted from the particular terminal to which the configuration information was previously transmitted by the configuration server. The acknowledgment may also include additional configuration changes that may have been made by the subscriber on the terminal itself. It is desirable to record these additional configuration changes, if any, on the configuration server so that the configuration server may have the most updated configuration information. Thus, in step 918, preferably the configuration server stores the last known configuration information in a database associated with the server. The step of verifying that the received information has actually been transmitted from the particular terminal to which the configuration information was previously transmitted provides a layer of security against malicious individuals. If desired, in step 919, the server may enable the terminal for use. For example, if the terminal has not yet been enabled, i.e. this is the first time that the terminal is being set-up, in this step the server may enable the terminal for use.

Thus, the connectivity and secure communications of the transaction processing device enables the use of a public network, such as the Internet, means for securely distributing, setting up and/or configuring the system. For example, based on the entered information about the provider of goods or services, for example a merchant, the configuration server may configure the transaction processing device. The cryptographic capabilities of the device allow mutual authentication between the device and a remote server, such as the configuration server, as well as a capability to encrypt sensitive data for transmission.

Moreover, if desired, information from the remote server may be provided to a plurality of such transaction processing devices as a group or individually. For example, the remote server can be used to change configuration information about the device, provide operating instructions, and/or the like. Thus, each device and/or its associated provider of goods and/or service does not have to be contacted individually.

The system and method for secure provisioning and/or configuration of the transaction processing device as described in this application may be used in a variety of applications, such as financial services, marketing services etc. For example, the device may be used for standard retail financial services, such as credit card processing, check processing, check verification, debit card processing, and private label card processing. It can also be used for other services that significantly benefit by the use of a secure public network. Such services include but are not limited to Internet gift certificates, point of purchase marketing, payroll processing, payroll management, electronically-captured receipts, electronically-captured receipt lookup, online reports and management, credit and lending services, business news and information, and other services that are not currently possible on card authorization devices. For example, a provider of goods or services may enter his driver's license number on the transaction processing device by entering the information on the keypad or by scanning his driver's license, or any other means. This information may be encrypted by the device and communicated to the remote server to uniquely identify the provider of goods or services. The provider could then request various services from the remote server. For example, the provider of goods or services could request information about an electronically captured receipt to settle disputes with a customer.

The preferred embodiment system and method for secure-provisioning and/or configuration of a standalone transaction processing device readily accessible on a public network, can be advantageous to both large businesses and SOHO type businesses. Even though currently large businesses provide credit and/or debit card processing facilities to the consumers, they are limited to only these specific types of services. Existing transaction processing terminals are not capable of providing added services described above. Moreover, they do not provide secure communication over a public network. Thus, by utilizing the present invention, these large businesses can provide added services to the consumers.

On the other hand, small businesses that do not currently provide credit and/or debit card processing facilities to their customers can provide such services at a nominal cost. The standalone device of the present invention can be provided to small businesses that can communicate over a public network to remote servers. These devices are able to perform secure communication in a very cost-effective manner as the device is completely integrated and includes substantially all of the components in a single device that does not need an external host computer for its operation.

The presence of a communications device, such as a modem, allows the device to connect a public network and use cryptographic and TCP/IP capabilities to perform secure communications of transaction data, such as configuration data, as well as other data over the public network. The device also provides the capabilities of communicating with the private networks for card authorization. A number of new services can be offered to the user because of the ability to transfer information securely over a public network. By integrating TCP/IP cryptographic capabilities and a communications device into a single transaction processing device, a significant cost advantage is obtained as external devices are not needed for communicating over a public network, such as the Internet. Moreover, a local host is not needed to act as a secure gateway or for performing the transactions. Secure communications can be completed without requiring a large transaction processing infrastructure such as those currently being used.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for remotely configuring a transaction processing device, comprising the steps of:
   authenticating said transaction processing device by a configuration server;
   authenticating said configuration server to said transaction processing device, if said configuration server includes configuration data about said transaction processing device;
   providing said configuration data to said transaction processing device by said configuration server;
   storing said provided configuration data by said transaction processing device;
   receiving by said configuration server an acknowledgment from said transaction processing device; and
   storing said received information including said configuration data by said configuration server.

2. The method of claim 1, wherein said authenticating said transaction processing device step comprises the steps of:
   initiating a connection with a communication network by said transaction processing device;
   encrypting an identifying token by said transaction processing device utilizing a private key of said transaction processing device;
   transmitting said encrypted identifying token via said communication network to said configuration server; and
   decrypting said received identifying token by said configuration server utilizing a public key of said transaction processing device.

3. The method of claim 2, wherein said authenticating said configuration server step comprises the steps of:
   encrypting an identifying number of said configuration server by said configuration server utilizing a private key of said configuration server;
   transmitting said encrypted identifying number via said communication network to said transaction processing device; and decrypting said received identifying number by said transaction processing device utilizing a public key of said configuration server.

4. The method of claim 3, wherein said step of providing configuration data comprises the steps of:
encrypting at least a portion of said configuration data by said configuration server; and
transmitting said encrypted configuration data to said transaction processing device.

5. The method of claim 4, wherein said step of storing said provided configuration data further comprises the steps of:
verifying by said transaction processing device that it is the intended recipient of said received encrypted configuration information; and
verifying by said transaction processing device that the received encrypted information was sent by said configuration server.

6. The method of claim 1, wherein said transaction processing device is a point-of-sale terminal.

7. The method of claim 1 wherein said configuration data provided to said transaction processing device by said configuration server comprises transaction processing device settings used for the initial setup of said transaction processing device.

8. A system for remote configuration of a transaction processing device, comprising:
a transaction processing device for providing a network service, wherein said transaction processing device comprises:
a first cryptographic services module for providing secure communication of information from said transaction processing device to said configuration server via said public communications network, and
a first communications protocol stack to facilitate communication over said communications network;
a remote configuration server, wherein said configuration server is capable of communicating securely with said transaction processing device via a public communications network, wherein said transaction processing device is capable of communicating securely with said configuration server via said public network, and wherein said transaction processing device is capable of being remotely configured by said configuration server via said public communications network, wherein said remote configuration server comprises:
a second cryptographic services module for providing secure communication of information from said configuration server to said transaction processing device via said public network,
a second communications protocol stack to facilitate communication with said transaction processing device over said communications network, and
a security services module, wherein said security services module extracts a public key of said transaction processing device from said certificate of said transaction processing device to authenticate said transaction processing device; and
a certificate manager communicatively connected to said transaction processing device, wherein said certificate manager issues a terminal certificate to said transaction processing device.

9. The system of claim 8, wherein said transaction processing device communicates securely over said public network without utilizing a host processor based system that is external to said device.

10. The system of claim 8, wherein said communications protocol stack is a TCP/IP stack.

11. The system of claim 8, wherein said configuration server comprises:
a configuration module, wherein said second cryptographic services module is part of said configuration module.

12. The system of claim 8, wherein said certificate manager issues a server certificate to said configuration server.

13. The system of claim 12, wherein said server certificate is stored in said second cryptographic services module.

14. The system of claim 13, wherein said server certificate is stored in said first cryptographic services module.

15. The system of claim 13, wherein said second cryptographic services module further comprises at least one cryptographic algorithm for encrypting information transmitted from said configuration server to said transaction processing device.

16. The system of claim 8, wherein said terminal certificate is stored in said first cryptographic services module.

17. The system of claim 16, wherein said terminal certificate is stored in said second cryptographic services module.

18. The system of claim 16, wherein said first cryptographic services module further comprises at least one cryptographic algorithm for encrypting information transmitted from said transaction processing device to said configuration server.

19. The system of claim 8, wherein said certificate manager is part of said configuration server.

20. The system of claim 8, wherein said second cryptography services module signs a hash of configuration data about said transaction processing device retrieved from a database services module of said configuration server with a private key of the configuration server.

21. The system of claim 20, wherein said signed configuration data is encrypted with said extracted public key of said transaction processing device and transmitted to said transaction processing device over said public communications network.

22. The system of claim 21, further comprising:
a web server for presenting a web based user interface to a user of said transaction processing device, wherein said user can update configuration data stored on said configuration server via said web based user interface.

23. The system of claim 22, wherein said web server comprises a user authentication module for verifying said user of said transaction processing device.

24. The system of claim 22 wherein said configuration data comprises at least one of:
a subscriber's logo;
a subscriber's business name;
a subscriber's terminal identifying monikers;
a subscriber's address;
a subscriber's telephone number;
a subscriber's URL;
a subscriber's fax number; and
a subscriber's email address.

25. The system of claim 20, wherein said signed configuration data is transmitted to said transaction processing device over said public communications network.

26. The system of claim 8 further comprising:
configuration data transmitted from said remote configuration server to said transaction processing device wherein said configuration data is stored on said remote configuration server and comprises transaction processing device settings used for the initial setup of said transaction processing device.

27. The system of claim 8 wherein said remote configuration server comprises:
- a configuration module comprising:
  - a database services module wherein said database services module is capable of storing configuration data; and
  - a software module wherein said software module determines if configuration data about said transaction processing device is stored on said database services module.

* * * * *